United States Patent [19]

Daniels et al.

[11] Patent Number: 4,499,545

[45] Date of Patent: Feb. 12, 1985

[54] METHOD AND APPARATUS FOR INDIVIDUALIZED SELECTION OF SPECIAL FEE POSTAGE VALUE COMPUTATIONS

[75] Inventors: Edward P. Daniels, Bridgeport; Daniel F. Dlugos, Huntington, both of Conn.

[73] Assignee: Pitney Bowes Inc., Stamford, Conn.

[21] Appl. No.: 393,857

[22] Filed: Jun. 30, 1982

[51] Int. Cl.[3] .................................... G06F 9/36

[52] U.S. Cl. .................................... 364/464; 364/200; 364/900; 177/25

[58] Field of Search ............... 364/466, 464, 900, 200; 177/25

[56] References Cited

U.S. PATENT DOCUMENTS

| | | | |
|---|---|---|---|
| 3,634,883 | 1/1972 | Kreidermacher | 364/200 |
| 4,218,757 | 8/1980 | Drogichen | 364/900 |
| 4,286,325 | 8/1981 | Dlugos et al. | 364/466 |
| 4,325,440 | 4/1982 | Crowley et al. | 177/25 |

FOREIGN PATENT DOCUMENTS

| | | | |
|---|---|---|---|
| 143669 | 10/1980 | Japan | 364/466 |

*Primary Examiner*—Jerry Smith
*Assistant Examiner*—Karl Huang
*Attorney, Agent, or Firm*—Robert H. Whisker; Albert W. Scribner; William D. Soltow, Jr.

[57] ABSTRACT

A method and apparatus are described for controlling access of a user of a postal value computing system to the computation of special fees. A directory memory stores a special fee control byte which is combined with a rate fee screen byte that is generated by the system to represent the special fee computations requested in response to actuation of the keyboard. The combining of the bytes employs a bit for bit AND operation with the result stored as a modified rate screen byte for use in the subsequent special fee computations. Access may then be granted or denied, depending upon the special fee control byte.

8 Claims, 1 Drawing Figure

METHOD AND APPARATUS FOR INDIVIDUALIZED SELECTION OF SPECIAL FEE POSTAGE VALUE COMPUTATIONS

FIELD OF THE INVENTION

This invention relates to postage value computation systems generally and more specifically to a method and apparatus for enabling a user of such system to choose his access to automatic computation of special postage fees.

BACKGROUND OF THE INVENTION

Postage value computation systems have been described in the art. Such system, in response to information of the weight of the article to be mailed and its destination, determines the amount of postage to be applied. The required postage is a function of many variables such as, for example, different classes, whether for United States Postal Service (USPS) or United Parcel Service (UPS) or international service, etc. In addition, special fees may be selected and additional required postage for that must be computed. Such special fees may be for registered mail, special delivery, return receipt, certified, insurance, or cash on delivery.

In the U.S. Pat. No. 4,286,325 to D. F. Dlugos et al, a postal value computing system is described capable of handling a wide range of postage variables. Such system organizes the postal values in rate charts occupying areas in a memory. The system employs a digital processor, keyboard and physically replaceable memories (also known as PROMS for programmable read-only memories) such as a rate memory in which the rate charts are stored and a directory memory which stores vectors to direct a program in the processor to rate charts to which access is requested by actuations of the keyboard.

In U.S. Pat. No. 4,325,440 to R. R. Crowley, E. P. Daniels and B. Holtz and entitled "Method And System For Computing Special Fees In A Parcel Postage Metering System", a technique is described to compute special postal fees.

In a co-pending patent application entitled "Method And Apparatus For Individualized Postage Value Computing" filed by D. F. Dlugos et al. on June 30, 1982 Ser. No. 393,839 and assigned to the same assignee a technique is described to enable a user to individualize his postage value computation system whereby only those postal rate values can be computed which the user has a need for. In such system, which employs replaceable directory and rate PROMS, the directory PROM is tailored to fit the needs of the user while the rate PROM is only updated, the rates and fees selected by the user so require. The latter system achieves such individualized tailoring by controlling data memories and without program modifications.

SUMMARY OF THE INVENTION

With a postal value computing method and apparatus in accordance with the invention, a user may choose to include or exclude access to special fee postal computations. This is achieved in one embodiment by modifying a special fee rate screen employed in the technique described in the aforementioned patent application related to special fee computations. The screen serves to determine which special fee is to be computed for a particular postal rate structure requested by the actuation of the keyboard.

A special fee control byte is stored in a directory memory and includes bits in locations that correspond to the bits in the rate fee screen byte. The values of the bits in the special fee control byte are selected to determine whether access to a special fee computation is to be granted. In one form of the invention, such control over access is exercised by combining the control byte with the rate fee screen in a particular manner and storing the combination as a replacement for the rate fee screen byte. When the program then proceeds with the special fee computation, an initial check of the rate fee screen byte determines whether the computation should continue or be bypassed.

The special fee control byte is stored in the directory memory. The directory includes suitable pseudo rate charts for controlling access to rate charts as described in the aforementioned patent application to Dlugos et al. The directory is thus preferably individualized for the particular user both as to rate charts and special fees.

A special fee control technique in accordance with the invention is particularly useful with existing postage value computing systems as described in the aforementioned Dlugos et al. patent. A special fee control can be added to such system with few program modifications.

It is, therefore, an object of the invention to provide a method and apparatus whereby a user of a postage value computing system may choose whether his system should compute special fees. It is a further object of the invention to provide control over access to the computation of special fees in postage value computing system in a convenient and simple manner.

These and other objects and advantages of the invention can be understood from the following detailed description of an embodiment in conjunction with the drawing.

DESCRIPTION OF EMBODIMENT

Figure 1:
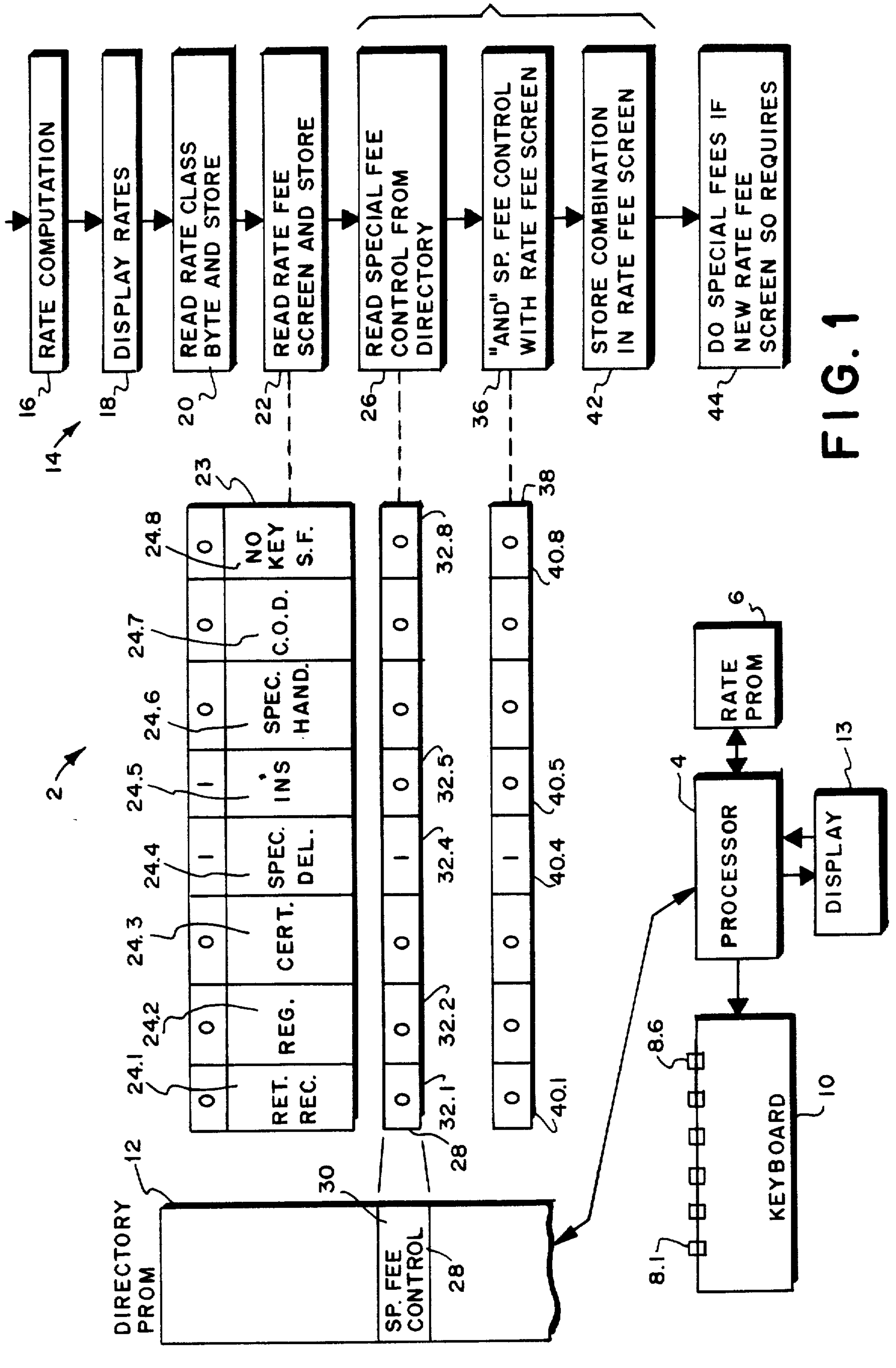
FIG. 1 is a schematic representation of a memory segment and program steps in a postal value computing system for establishing control over the access of the computation of special fees.

In the FIGURE a technique 2 is shown for establishing access control over the computation of special fees with a postage value computing system, not shown, but as shown and described in the U.S. Pat. Nos. 4,286,325 to D. F. Dlugos et al. and 4,325,440 to R. R. Crowley et al. Such system incorporates a microprocessor 4 with memories and a program to calculate postage values for a wide variety of mailing methods as are generally encountered and as more particularly described in the patent. The postage value computing system organizes postage values in rate charts, not shown here, in a physically replaceable rate memory 6. Computation of a postal value is commenced with the actuation of a key 8 in a keyboard 10, thus causing a transfer of the program in the processor to a directory memory 12. The latter memory is also a physically replaceable memory and is preferably tailored to fit the needs of a user in the manner as described in the aforementioned Dlugos et al. patent application. A visual display 13 is included in the system and operated by the program processor 4.

The computation of special fees involves a program, only a part 14 being shown in FIG. 1, and which employs at 16 those program steps used to compute a rate for a class in the manner described in U.S. Pat. No. 4,286,325. The computed rates are displayed at 18 and at 20 a byte related to the class for which postage was computed is read from the rate memory and temporarily stored in a random access memory location.

The class byte serves to determine the type of class that is being computed. This information is needed during the special fee computation since for certain classes certain special fees either are not available or may be mutually exclusive. For example, if the class byte represents third class, then the article for which postage is to be computed cannot be mailed registered.

At 22 a special rate fee screen 23 is read and temporarily stored. Special rate fee screen byte 23 is, as described in the aforementioned special fee computing U.S. Pat. No. 4,235,440, an eight bit word as shown at 23. The bits in the word 23 represent particular special functions that are permissible with the selected class. Thus, for example, bit 24.1, if an active one, indicates that Return Receipt is proper. Bit 24.2 represents registered mail, bit 24.3 certified mail, with the sequential bits respectively representing special delivery, insurance, special handling and C.O.D. (cash on delivery). The last bit 24.8 is a spare bit which may be employed to indicate to the program that no special fee computation is to be made for that particular specific fee. There are as many special rate fee screen bytes 23 as there are mailing classes that require such screen to enable the computation of permsisible special fees.

At 26 the program reads a special fee control byte 28 at location 30 in directory memory 12 and stores the control byte in a suitable random access memory location. The control byte 28 is provided with as many bits as there are special fee bits in word 23. At 36 the program 14 combines the rate fee screen 23 with the special fee control 28. This combining step in practice ANDs the corresponding bits. Thus, bit 24.1 is ANDed with bit 32.1 and so on for all bits. The result is a modified eight bit rate fee screen 38.

The AND type of combination of the respective bits 24 and 32 in rate fee screen 23 and control word 28 results in that all special fee requests are cancelled to zero unless a one is present in both bits that are being ANDed. Thus, bit 40.4 in the new rate fee screen 38 is an active one since both bits 24.4 and 32.4 were active ones. On the other hand, bit 40.5 is a deactive zero since bit 32.5 was inactive. The AND combining of bits is a well known logic process.

The modified rate fee screen 38 is then stored at 42 as the new rate fee screen in the same temporary memory location in which the old rate free screen 23 was stored at step 22. At 44 a routine for computing the special fee is begun based upon the new rate fee screen 38. The special fee computation is done in the manner as described in the aforementioned patent application for computing special fees.

In the special fee computations 44, comparisons are made between the appropriate bit in the modified rate fee screen and the original rate fee screen. If the two screens are not the same, the special fee computation for which the comparison was made is cancelled and a return of the program is made. Hence, by controlling the contents of the rate fee screen with the control byte 28, access to individual special functions may be selected by a user. As a result, the replacement of rate memories 6 because of postal rate changes can be limited to those to which the user has access.

Having thus explained an embodiment for granting or denying access to special fee computations in accordance with the invention, its advantages can be appreciated. Variations may be employed without departing from the scope of the invention. For example, in the embodiment a single control byte 28 is employed to determine which special fee is to be computed. The selected special fee is then available for all classes. However, one could employ a number of control bytes 28 for respectively different mailing classes.

What is claimed is:

1. A method for controlling access to the computation of special fees so as to limit access to selected allowable special fee computations with a postage value computing system having a program operated processor, a rate memory to store postage rate information, a directory memory to store vectors to direct the program in the processor to rate charts and special fee computations to which access is requested by actuations of a keyboard comprising the steps of:

storing in the system a rate fee screen byte representative of special fee computations permitted with a particular mailing class;

recalling a special fee control byte representative of special fee computations as to which access is allowable;

combining the rate fee screen byte with the special fee control byte to form a modified rate fee screen byte; and computing special fees in accordance with the modified rate fee screen byte.

2. The method for controlling access to special fee computations as claimed in claim 1 wherein the combining step includes the step of:

forming a logical AND between corresponding bits in the rate fee screen and special fee control bytes wherein the bits that correspond relate to the same special fee, and storing the result of the logical AND step in said modified rate fee screen byte.

3. The method for controlling access to a special fee computation as claimed in claim 1 wherein said recalling step incudes the step of:

recalling the special fee control byte from a predetermined location of said directory memory.

4. An apparatus for the computation of a postage value with a system in which a processor operated by a program is used with physically replaceable rate and directory memories wherein the rate memory includes rate chart data used to compute postage values for articles to be mailed in various modes and under special conditions in response to actuations of a keyboard, wherein the improvement comprises:

a physically replaceable directory memory incorporating at a predetermined location a special fee control byte containing bits selected to control access to the computation of special fees.

5. An apparatus as described in claim 4 wherein said rate memory includes a predetermined location for storing a special fee rate screen byte formed of a predetermined number of bits, set in accordance with the keyboard actuations, which respectively represent different requests for special fee computations, wherein the improvement further comprises;

said directory memory wherein said special fee control byte contains corresponding bits as said special fee rate screen byte for respective control of access to said special fee computation.

6. An apparatus for controlling access to the computation of special fees with a postage value computing system having a program operated processor, so as to allow access to selected allowable special fee computations, a rate memory to store postage rate information, a directory memory to store vectors to direct the program in the processor to rate charts and special fee computations to which access is requested by actuations of a keyboard with means for generating a rate fee screen byte representative of special fee computations permitted for different mailing classes, comprising:

means for storing a special fee control byte representative of special fee computations as to which access is allowable; and means for combining the rate fee screen bytes with the special fee control byte to form modified rate fee screen byte representative of the special fees to which access is allowed or denied.

7. The apparatus as claimed in claim 6 wherein said storing means comprises said directory memory.

8. The apparatus as claimed in claim 6 or 7 wherein said combining means includes:

means for logically ANDing bits in said rate fee screen bytes with corresponding bits in said control fee byte to form said modified rate fee screen bytes.

* * * * *